United States Patent [19]
Yoo

[11] Patent Number: 5,457,580
[45] Date of Patent: Oct. 10, 1995

[54] VIDEO COMPRESSION/EXPANSION APPARATUS FOR DIGITAL VCR

[75] Inventor: Byoung K. Yoo, Seoul, Rep. of Korea

[73] Assignee: Goldstar Co., Ltd., Seoul, Rep. of Korea

[21] Appl. No.: 114,161

[22] Filed: Sep. 1, 1993

[30] Foreign Application Priority Data

Aug. 2, 1992 [KR] Rep. of Korea ............... 15945/1992
Dec. 15, 1992 [KR] Rep. of Korea ............... 24303/1992

[51] Int. Cl.⁶ .................................................. H04N 5/782
[52] U.S. Cl. ......................... 360/36.2; 358/339; 360/32; 360/48
[58] Field of Search ................... 360/33.1, 36.1, 360/36.2, 32, 48; 370/94.2; 358/339; 348/390, 403; 395/550

[56] References Cited

U.S. PATENT DOCUMENTS

| | | | |
|---|---|---|---|
| 4,907,081 | 3/1990 | Ohamura et al. | 348/390 |
| 5,195,092 | 3/1993 | Wilson et al. | 370/94.2 |
| 5,204,754 | 4/1993 | Fukatsu et al. | 369/32 X |
| 5,231,543 | 7/1993 | Kubota et al. | 360/36.1 |
| 5,276,858 | 1/1994 | Oak et al. | 395/550 |

*Primary Examiner*—W. R. Young

[57] ABSTRACT

A video compression/expansion apparatus for a digital VCR, having an analog/digital converter, a memory, a video compression/expansion device, a compressed data memory, a modem, an error corrector, a deformatter, a first buffer, a second buffer and a digital/analog converter sequentially connected and electrically coupled to one another. According to the invention, the apparatus comprises a first logic control circuit for controlling the video compression/expansion device and the compressed data memory to transform compressed video data of 32 bits from the video compression/expansion device into four 8-bit data and alternately ,store the transformed four 8-bit data into first and second memories of the compressed data memory, a formatter for reading the compressed video data from the first and second memories and formatting the read video data at a fixed rate, an error correcting code generator for detecting an error of the compressed video data formatted by the formatter and generating an additional code for correction of the detected error, and a second logic control circuit responsive to clock and vertical synchronous signals from the deformatter for storing and rearranging compressed video data from the deformatter and controlling transmission of the rearranged video data to the video compression/expansion device.

3 Claims, 8 Drawing Sheets

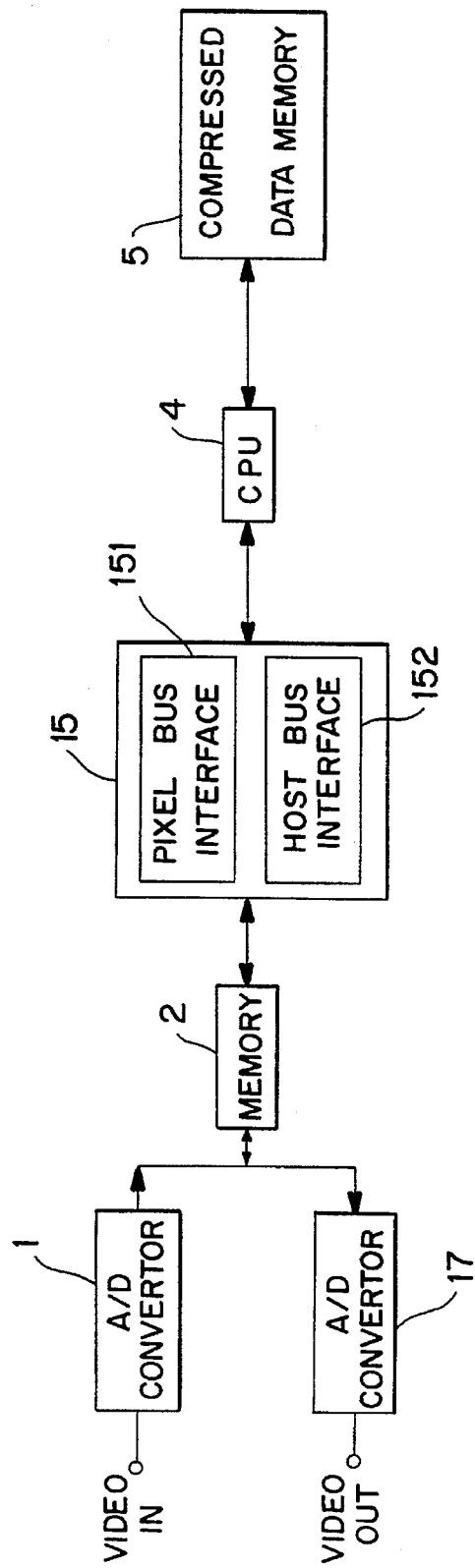
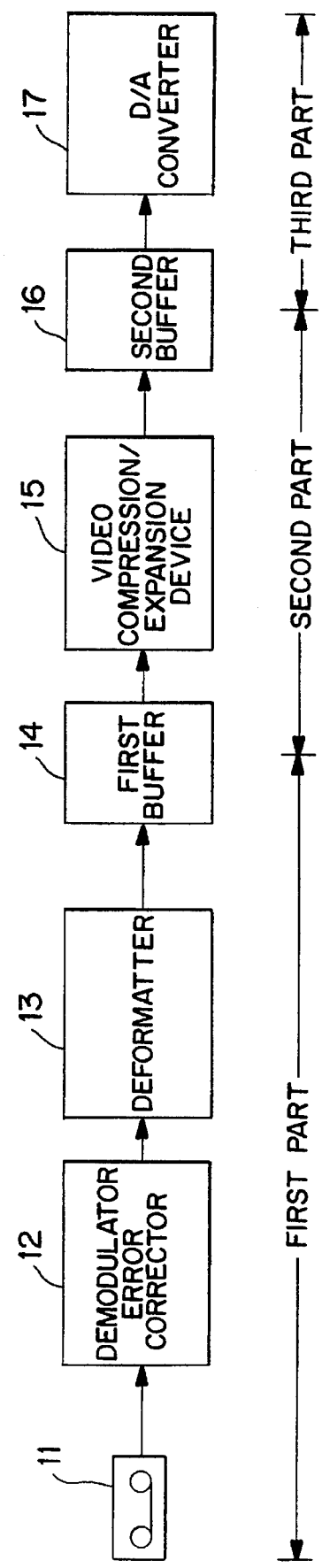

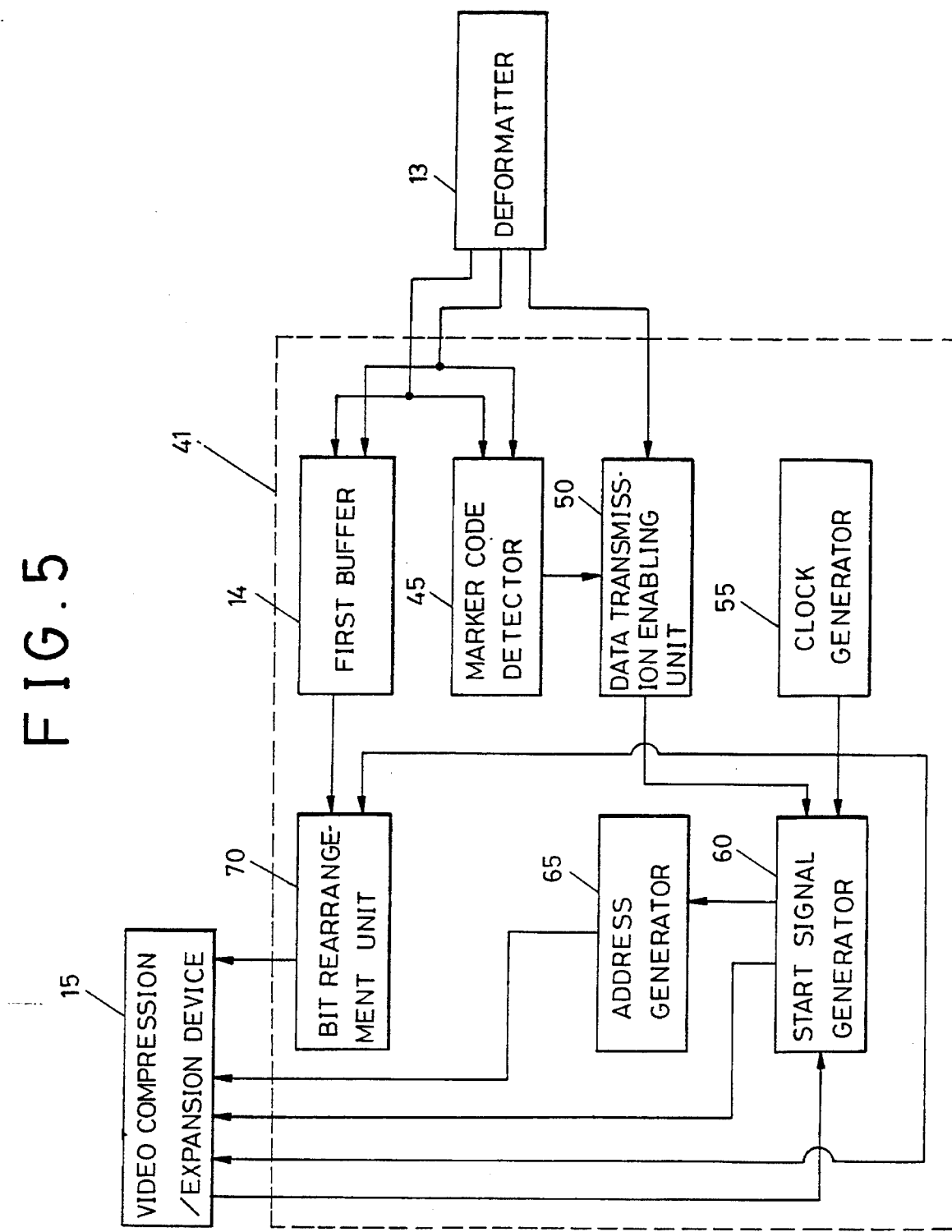

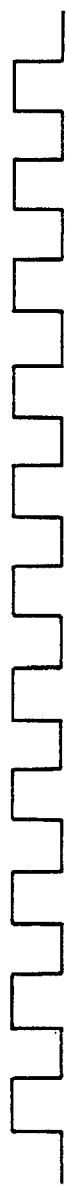
FIG. 6A  HB CLK
FIG. 6B  $\overline{\text{START}}$
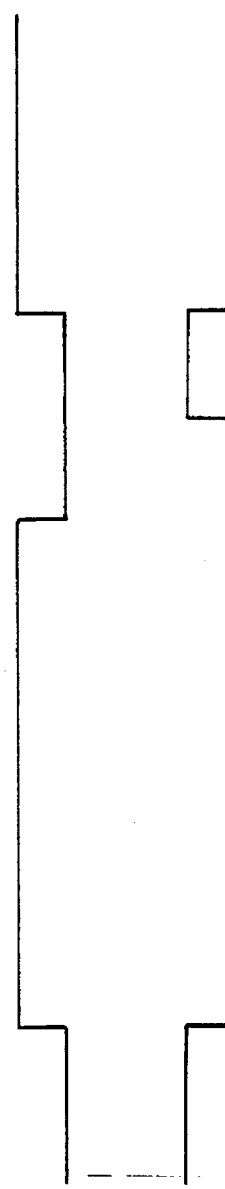
FIG. 6C  $\overline{\text{DRQ}}$
FIG. 6D  SE
FIG. 6E  TM(0)
FIG. 6F  TM(1)
FIG. 6G  TM(2)

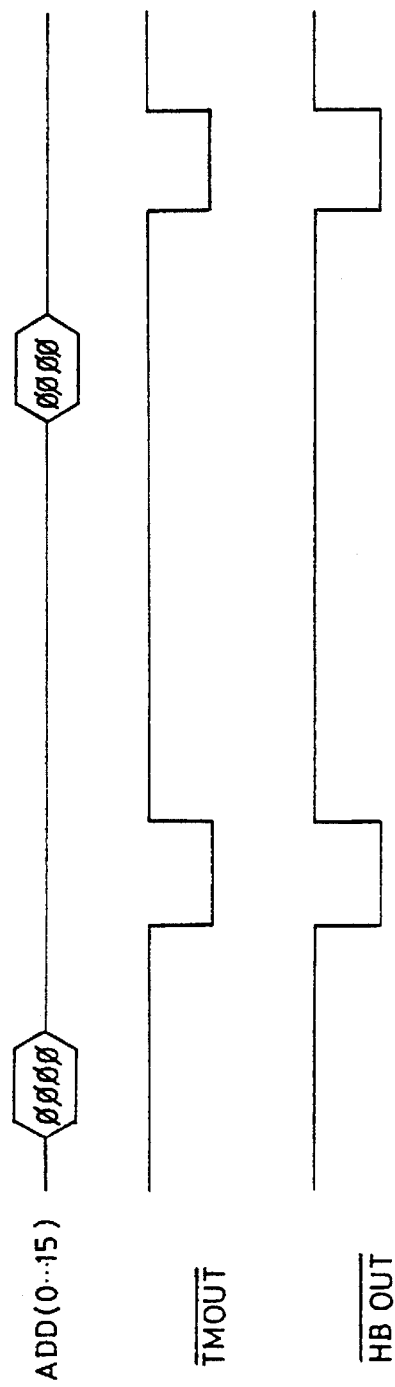
FIG. 6H  ADD(0...15)
FIG. 6I  $\overline{\text{TMOUT}}$
FIG. 6J  $\overline{\text{HB OUT}}$
FIG. 6K  HOST BUS (0...31)

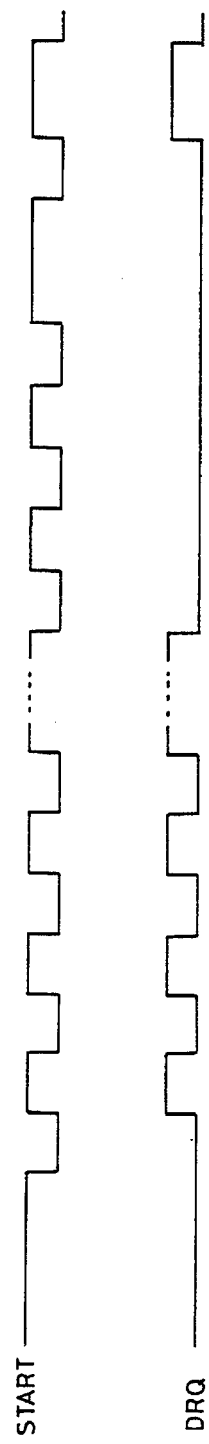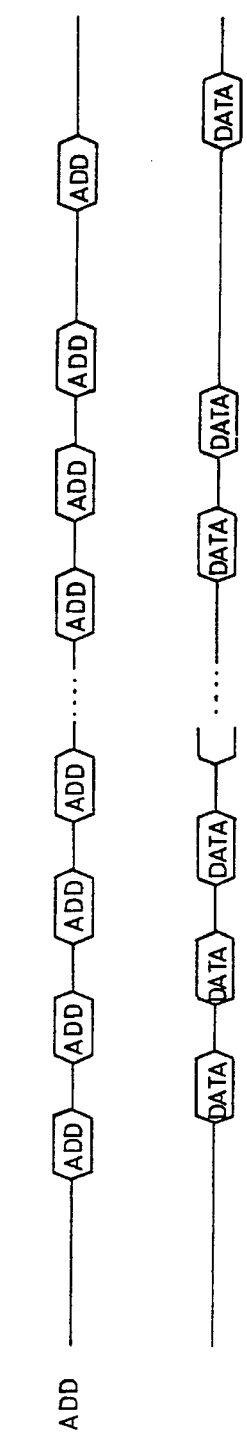
FIG. 7G  START
FIG. 7H  DRQ
FIG. 7I  ADD
FIG. 7J

VIDEO COMPRESSION/EXPANSION APPARATUS FOR DIGITAL VCR

BACKGROUND OF THE INVENTION

1. Field of the Invention

The present invention relates in general to video compression/expansion apparatus for video cassette recorders (VCRs), and more particularly to a video compression/expansion apparatus for a home digital VCR which is capable of, utilizing a video compression/expansion device, compressing a still video signal as well as a motion video signal to record the compressed video data on a video tape and expanding the compressed video data recorded on the video tape to play back the original video signals.

2. Description of the Prior Art

Referring to FIG. 1, there is shown a schematic block diagram of a conventional video compression apparatus. As shown in this drawing, the conventional video compression apparatus comprises an analog/digital (A/D) converter 1 for converting an analog video signal inputted therein into digital video data, a memory 2 for storing the digital video data From the A/D converter 1, a video compression/expansion device 15 for compressing the video data stored in the memory 2 and expanding the:compressed video data, a central processing unit (CPU) 4 for controlling read and write operations of the compressed data from the video compression/expansion device 15, a compressed data memory 5 for storing the compressed data from the video compression/expansion device 15 under the control of the CPU 4, and a digital/analog converter 17 for converting the digital video data from the A/D converter 1 or the memory 2 into the original analog video signal and outputting the converted analog video signal externally.

In operation, upon receiving the analog video signal, for example, included in a television (TV) signal, the A/D converter 1 converts the received analog video signal into digital data, which is then stored in the memory 2 in the unit of field or frame. The digital video data stored in the memory 2 is inputted by the video compression/expansion device 15 through a pixel bus interface 151 thereof. The video compression/expansion device 15 compresses the inputted video data on the basis of a JPEG algorithm and outputs the compressed video data to the compressed data memory 5 through a host bus interface 152 thereof under the control of the CPU 4 so that the compressed video data can be stored in the compressed data memory 5 as needed, The compressed video data is read from the compressed data memory 5 under the control of the CPU 4 and then applied to the video compression/expansion device 15. Upon receiving the compressed video data from the compressed data memory 5, the video compression/expansion device 15 expands the compressed video data into the original state and stores the expanded video data into the memory 2. The expanded video data stored in the memory 2 is converted into the original analog video signal by the D/A converter 17, which then outputs the converted analog video signal to a monitor.

However, the conventional video compression apparatus is desirable to compress a still video signal under the control of the CPU, but has a disadvantage in that it can hardly compress a video signal included in a TV signal of a NTSC system in a real. Lime manner since the CPU has a low processing speed.

Referring to FIG. 2, there is shown a schematic block diagram of a conventional video expansion apparatus employing the video compression/expansion device 15 in FIG. 1. As shown in this figure, the conventional video expansion apparatus comprises a demodulator/error corrector 12 for demodulating compressed video data read from a video tape 11 and correcting an error of the demodulated video data, a deformatter 13 for extracting only actual video data from output data from the demodulator/error corrector 12, and a first buffer 14 for storing the extracted video data from the deformatter 13 temporarily.

The video compression/expansion device 15 is provided in the conventional video expansion apparatus to expand the video data stored in the first buffer 14.

Also, the conventional video expansion apparatus comprises a second buffer 16 for storing the expanded video data from the video compression/expansion device 15 temporarily.

The D/A converter 17 in FIG. 1 is also provided in the conventional video expansion apparatus to convert the video data stored in the second buffer 16 into an analog video signal and output the converted analog video signal to display it.

In operation, upon receiving the compressed video data read from the video tape 11, the demodulator/error corrector 12 demodulates the compressed video data into the original state and then corrects the error of the demodulated video data which occurred on the video tape 11 . The deformatter 13 extracts only the actual video data from the output data from the demodulator/error corrector 12 and then stores the extracted video data into the first buffer 14 temporarily.

Thereafter, the video data stored in the first buffer 14 is expanded into the original state by the video compression/expansion device 15 and then temporarily stored in the second buffer 16. The video data stored in the second buffer 16 is converted into the analog video signal by the D/A converter 17, which then outputs the converted analog video signal so that the analog video signal can be displayed in a desired scanning manner.

Noticeably, in order to effectively expand the video data, the conventional video expansion apparatus employing the video compression/expansion device 15 may greatly be divided into three parts in which different clocks are used, or first to third parts as shown in FIG. 2. For this reason, the three parts must be synchronous with one another to real time-process the operations of reading the compressed video data from the video tape 11, expanding the read, compressed video data and displaying the expanded video data. In this connection, the conventional video expansion apparatus has a disadvantage, in that it is impossible to synchronize the clock used in the second part with the clocks used in the first and third parts utilizing a phase locked loop (PLL) since the compressed video data stored in the first buffer 14 is variable length coded data.

SUMMARY OF THE INVENTION

Therefore, the present invention has been made in view of the above problems, and it is an object of the present invention to provide a video compression/expansion apparatus for a digital VCR which comprises a video compression/expansion device and logic control circuits for the control of video compression/expansion data transmission.

In accordance with the present invention, the above and other objects can be accomplished by a provision of a video compression/expansion apparatus for a digital VCR, comprising an analog/digital converter, a memory, a video compression/expansion device, compressed data storage means and a modem sequentially connected and electrically coupled to one another, for converting an analog video signal into digital video data, compressing the digital video data and recording the compressed video data on a video tape, and comprising an error corrector, a deformatter, a first buffer, a second buffer and a digital/analog converter sequentially connected and electrically coupled to one another, said error corrector connected to an output of said modem, said first buffer connected to an input of said video compression/expansion device, said second buffer connected to an output of said video compression/expansion device, for expanding the compressed video data recorded on the video tape to playback the original analog video signal, wherein the improvement comprises: said compressed data storage means having first and second memories; first logic control means for controlling said video compression/expansion device and said compressed data storage means to transform compressed video data of 32 bits from said video compression/expansion device into four 8-bit data and alternately store the transformed four 8-bit data into said first and second memories of said compressed data storage means; formatting means for reading the compressed video data from said first and second memories of said compressed data storage means and formatting the read video data at a fixed rate; error correcting code generating means for detecting an error of the compressed video data formatted by said formatting means, generating an additional code for correction of the detected error and outputting the generated additional code together with the compressed video data; and second logic control means responsive to a clock signal and a vertical synchronous signal from said deformatter for storing and rearranging compressed video data from said deformatter and controlling transmission of the rearranged, compressed video data to said video compression/expansion device.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic block diagram of a conventional video compression apparatus;

FIG. 2 is a schematic block diagram of a conventional video expansion apparatus;

FIG. 5 is a detailed block diagram of a second logic control circuit in the video compression/expansion apparatus in FIG. 3;

FIGS. 6A to 6K are timing diagrams of signals from components in the first logic control circuit in FIG. 4; and FIGS. 7A to 7J ape timing diagrams of signals from components in the second logic control circuit in FIG. 5.

DETAILED DESCRIPTION OF THE PREFERRED EMBODIMENTS

Figure 3:
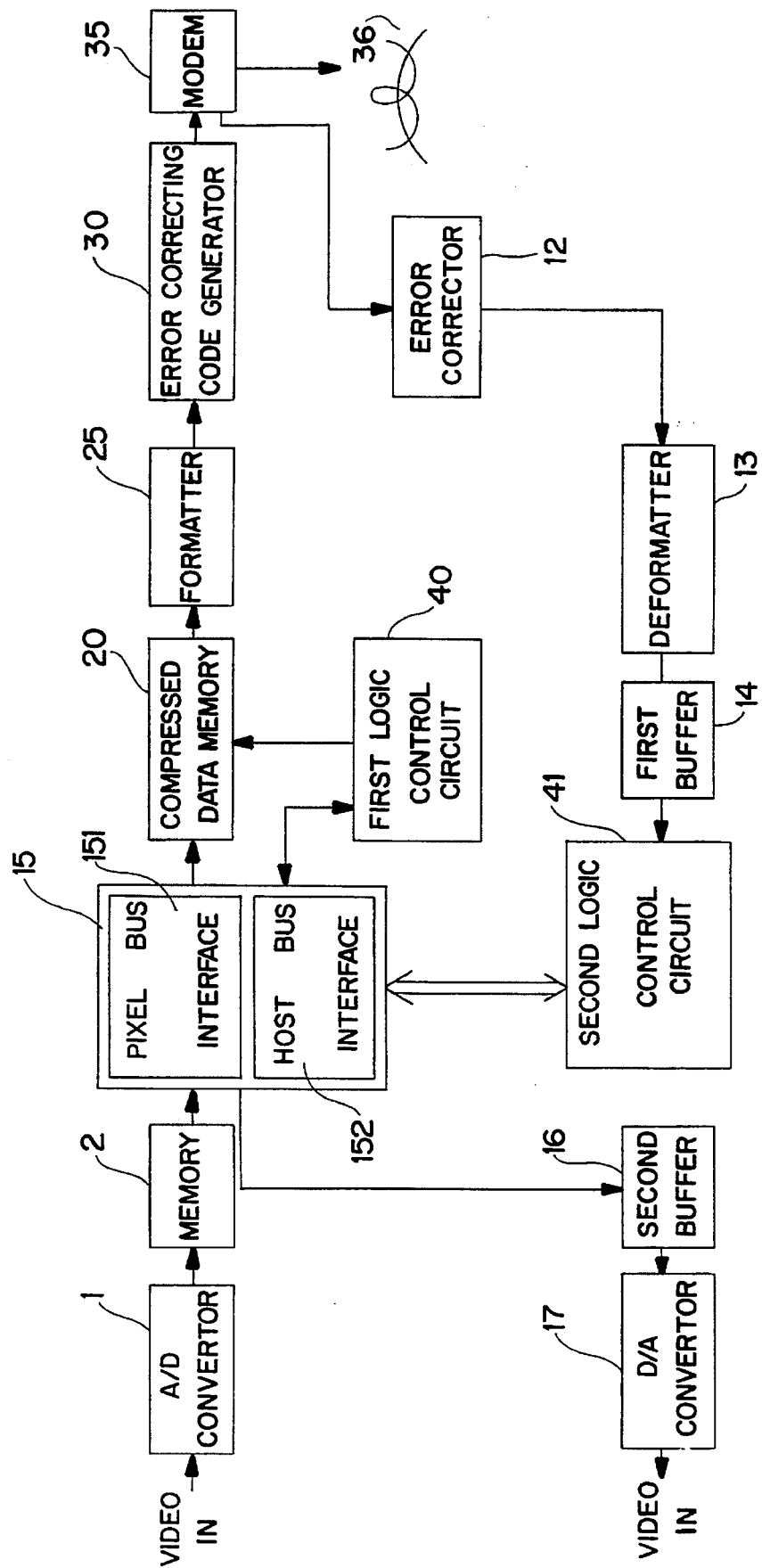
FIG. 3 is a block diagram of a video compression/ expansion apparatus for a digital VCR in accordance with the present invention.

Referring to FIG. 3, there is shown a block diagram of a video compression/expansion apparatus for a digital VCR in accordance with the present invention. Some of parts in FIG. 3 are the same as those in FIGS. 1 and 2. Therefore, like reference numerals designate like parts.

As shown in FIG. 3, the video compression/expansion apparatus comprises the A/D converter 1 for converting an analog video signal inputted therein into digital video data. The memory 2 stores the digital video data from the A/D converter 1. The video compression/expansion device 15 compresses the video data stored in the memory 2 and expands the compressed video data.

The video compression/expansion apparatus also comprises a compressed data memory 20 for storing the compressed video data from the video compression/expansion device 15, a first logic control circuit 40 for controlling the video compression/expansion device 15 and the compressed data memory 20, a formatter 25 for reading the compressed video data from the compressed data memory 20 and formatting the read video data at a fixed rate, an error correcting code generator 30 for detecting an error of the compressed video data formatted by the formatter 25, generating an additional code for correction of the detected error and outputting the generated additional code together with the compressed video data, and a modem 35 for modulating the compressed video data from the error correcting code generator 30 to record it on a video tape and demodulating the compressed video data read from the video tape.

The error corrector 12 corrects an error of the compressed video data demodulated by the modem 85. The deformatter 18 extracts only actual compressed video data from output data from the error corrector 12 and outputs the extracted, compressed video data together with a clock signal and a vertical synchronous signal.

Also, the video compression/expansion apparatus comprises a second logic control circuit 41 responsive to the clock signal and the vertical synchronous signal from the deformatter 13 for storing and rearranging the compressed video data from the deformatter 13 and controlling transmission of the rearranged compressed video data to the video compression/expansion device 15.

The second buffer 16 stores the expanded video data from the video compression/expansion device 15 temporarily. The D/A converter 17 converts the video data stored in the second buffer 16 into the original analog video signal and outputs the converted analog video signal externally.

Figure 4:
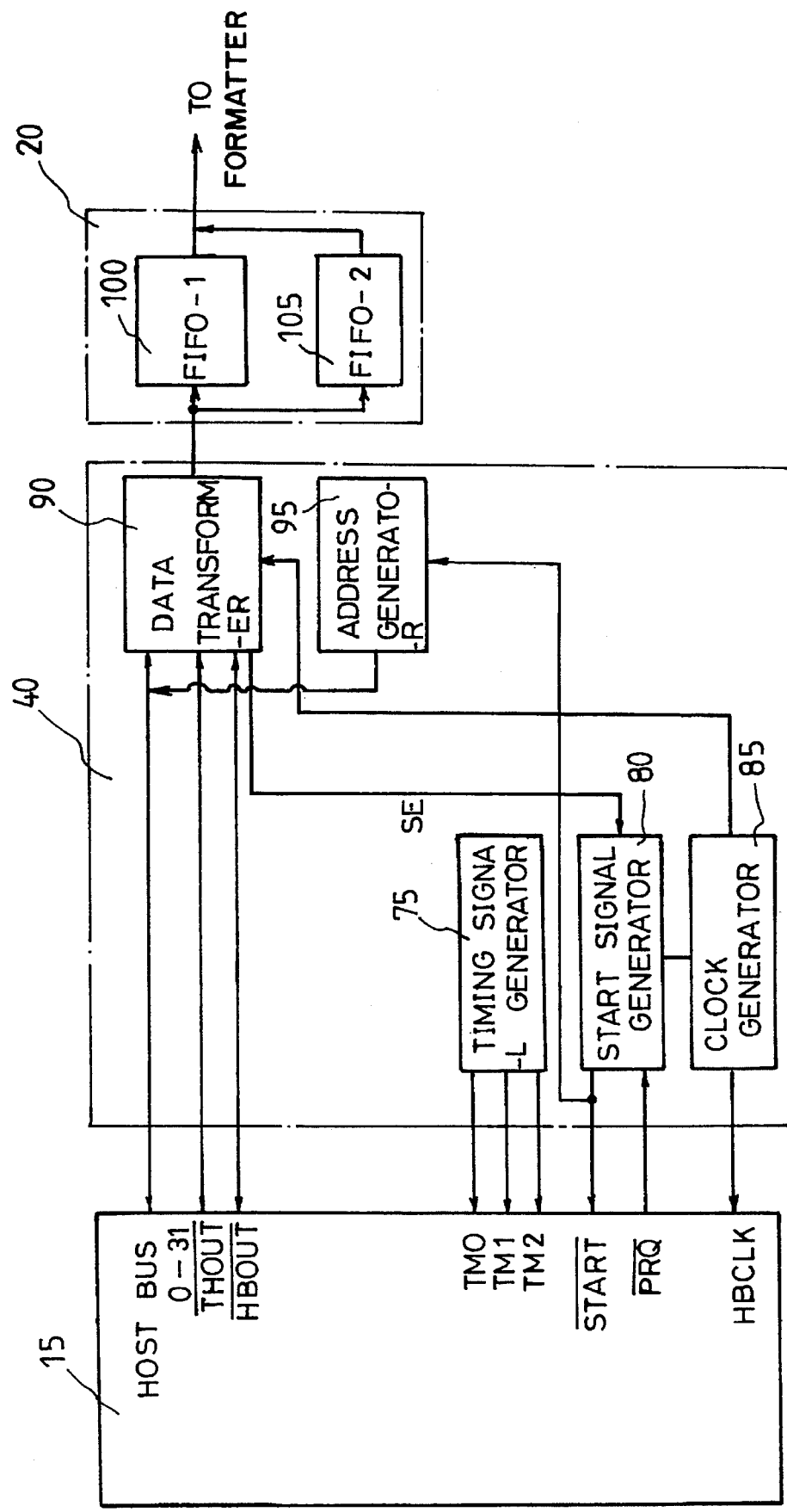
FIG. 4 is a detailed block diagram of a first logic control circuit in the video compression/expansion apparatus in FIG. 3.

Referring to FIG. 4, there is shown a detailed block diagram of the first logic control circuit 40 in the video compression/expansion apparatus in FIG. 3. As shown in this figure, the first logic control circuit 40 includes a timing signal generator 75 for generating three timing signals TM0-TM2 to the host bus interface 152 of the video compression/expansion device 15, a data transformer 90 for transforming the compressed video data of 32 bits from the host bus interface 152 into four 8-bit data and alternately outputting the transformed four 8-bit data to first and second FIFO memories 100 and 105 of the compressed data memory 20, a start signal generator 80 for generating a data transmission start signal/START in response to a data request signal/DRQ from the host bus interface 152 and a start enable signal SE from the data transformer 90 and outputting the generated data transmission start signal/START to the host bus interface 152, a clock generator 85 for generating a clock signal to the host bus interface 152, the start signal generator 80 and the data transformer 90, and an address generator 95 for generating an address signal to the host bus interface 152 in response to the data transmission start signal/START from the 10 start signal generator 80.

Referring to FIG. 5, there is shown a detailed block diagram of the second logic control circuit 41 in the video compression/expansion apparatus in FIG. 3. As shown in this drawing, the second logic control circuit 41 includes a marker code detector 45 for detecting a marker code of the compressed video data from the deformatter 13 in response to the clock signal from the deformatter 13 and outputting a marker code detect signal MCD upon detecting the marker code, and a data transmission enabling unit 50 for generating a data transmission enable signal DTE in response to the vertical synchronous signal from the deformatter 13 and the marker code detect signal MCD from the marker code detector 45.

The first buffer 14 is provided in the second logic control circuit 41 to store the compressed video data from the deformatter 113 in the unit of 8 bits in response to the clock signal from the deformatter 13 and the data transmission enable signal DTE from the data transmission enabling unit 50.

Also, the second logic control circuit 41 includes a clock generator 55 for generating a clock signal, a start signal generator 60 for generating a start signal START in response to a data request signal DRQ from the video compression/expansion device 15, the data transmission enable signal DTE from the data transmission enabling unit 50 and the clock signal from the clock generator 55, an address generator 65 for generating an address signal ADD in response to the start signal START from the start signal generator 60, and a bit rearrangement unit 70 for rearranging the compressed video data stored in the first buffer 14 into 32-bit data in response to the clock signal from the clock generator 55.

The operation of the video compression/expansion apparatus with the above-mentioned construction in accordance with the present invention will hereinafter be described in detail with reference to FIGS. 6A to 6K and FIGS. 7A to 7J which are timing diagrams of the signals from the components in the first and second logic control circuits 40 and 41, respectively.

The data compression is performed to record the video signal on the video tape in a recording mode. Upon receiving the analog video signal, the A/D converter 1 converts the received analog video signal into digital data, which is then stored in, the memory 2 in the unit of field or frame. The video compression/expansion device 15 inputs the digital video data stored in the memory 2 through the pixel bus interface 151 thereof and compresses the inputted digital video data.

The video compression/expansion device 15 outputs the compressed video data to the compressed data memory 20 through the host bus interface 152 thereof for storage of the compressed video data in the compressed data memory 20. The transmission of the compressed video data is performed through the host bus interface 152 of the video compression/expansion device 15 under the control of the first logic control circuit 40 as shown in detail in FIG. 4.

The data transmission from the video compression/expansion device 15 is established on the basis of a handshaking rule which is a kind of asynchronous data transmission method. Namely, the transmission of the compressed video data from the video compression/expansion device 15 is started in response to a start signal and ended in response to an acknowledgement signal.

First, in the first logic control circuit 40, the start signal generator 80 generates the data transmission start signal/ START as shown in FIG. 6B For the start of the data transmission in the data compression. The start signal/ START from the start signal generator 80 goes low when the data request signal/DRQ from the video compression/expansion device 15 as shown in FIG. 6C is low and the start enable signal SE from the data transformer 90 as shown in FIG. 6D goes high as will be described later in detail. Here, the data request signal/DRQ goes low after the video compression/expansion device 18 gets ready to output the compressed video data.

At this time, the timing signal generator 75 generates the three timing signals TM0-TM2 as shown in FIGS. 6E to 6G to the host bus interface 182 of the video compression/ expansion device 15. As shown in FIGS. 6E to 6G, when the start signal /START goes low, the timing signal TM0 is in a high impedance state Hi-z and the timing signals TM1 and TM2 go high. If the start signal/START goes high, the timing signal TM0 is still in the high impedance state Hi-z and the timing signals TM1 and TM2 are turned into the high impedance state Hi-z.

When the start signal/START from the start signal generator 80 is low, the address generator 95 outputs a 16-bit address $ADD0_H$-$ADD15_H$ to low order 16 bit lines of 32 bit lines 0–31 of "$0000_H$" of the host bus interface 152, as shown in FIG. 6H. On the contrary, when the start signal/ START from the start signal generator 80 is high, the address generator 95 maintains its address at the high impedance state.

Then, upon recognizing the start signal/START from the start signal generator 80, the video compression/expansion device 15 makes the timing signal TM2 as the acknowledgement signal low, makes signals/TMOUT and/HBOUT as shown in FIGS. 6I and 6J low and makes the timing signals TM0 and TM1 low. Also, video compression/expansion device 15 outputs the compressed video data through the 32 bit lines 0–31 of the host bus interface 152 thereof, as shown in FIG. 6K. As a result, the data transmission started by the start signal /START is ended. Thereafter, the above operation is repeatedly performed with the start signal/START.

On the other hand, when the timing signal TM2 and the host bus output signal/HBOUT are low, the data transformer 90 latches the compressed video data of 32 bits From the host bus interface 152 of the video compression/expansion device 15 at a negative edge of the clock signal/HBCLK from the clock generator 85 as shown in FIG. 6A and then divides the 32-bit video data into four 8-bit data.

The four 8-bit data from the data transformer 90 are alternately stored in the compressed data memory 20 which consists of the two FIFO memories 100 and 105 as shown in FIG. 4. Namely, the compressed video data of the first field is stored in the first memory 100 and the compressed video data of the second field is stored in the second memory 105. The selection of the First and second memories 100 and 105 is performed by detecting data $FFD0_H$-$FFD7_H$ contained in the 32-bit video data. Each 8-bit data $FFD0_H$-$FFD7_H$ is added at the end or the compressed video data of each field by the video compression/expansion device 15 to indicate the end of each field.

The start enable signal SE from the data transformer 90 goes low at a positive edge of the start signal/START from the start signal generator 80. Then, when all the 32-bit video data outputted based on the start signal/START are stored in the compressed data memory 20, the start enable signal SE from the data transformer 90 goes high. The use of the start enable signal SE has the effect, of preventing the next compressed video data from being latched in the data transformer 90 resulting in a data conflict until the present 32-bit video data is latched in the data transformer 90 and then stored in the compressed data memory 20.

The formatter 25 reads the compressed video data from the compressed data memory 20 alternately beginning with one of the two memories 100 and 105 which is not in the write operation. Then, the formatter 25 formats the read video data at the fixed rate. The error correcting code generator 30 detects the error of the compressed video data formatted by the formatter 25, generates the additional code for correction of the detected error and outputs the generated additional code together with the compressed video data to the modem 35. The compressed video data, from the error correcting code generator 30 is modulated into a recordable state by the modem 35 and then recorded on the video tape through a video head On,the other hand, when the compressed video data is read from the video tape through the video head 36, it is demodulated by the modem 35 and then applied to the error corrector 12, which corrects the error of the compressed video data demodulated by the modem 35 which occurred on the video tape. The deformatter 13 extracts only the actual compressed video data from the output data from the error corrector 12 and outputs the extracted, compressed video data as shown in FIG. 7C together with the clock signal as shown in FIG. 7A and the vertical synchronous signal Vsync as shown in FIG. 7B.

The compressed video data which is outputted from the deformatter 13 every field is constant in number. The compressed video data from the deformatter 13 includes variable length coded data and dummy data unnecessary to the data expansion. The variable length coded data is different in number every field.

In the second logic control circuit 41 as shown in detail in FIG. 5, the compressed video data and the clock signal from the deformatter 13 are applied to the first buffer 14 and the marker code detector 45. In response to the clock signal from the deformatter 13, the marker code detector 45 detects the marker code of the compressed video data from the deformatter 13 and outputs the marker code detect signal MCD as shown in FIG. 7D to the data transmission enabling unit 50 upon detecting the marker code. In response to the marker code detect signal MCD from the marker code detector 45 and the vertical synchronous signal from the deformatter 13, the data transmission enabling unit 50 outputs the data transmission enable signal DTE as shown in FIG. 7E to the first buffer 14. As shown in FIG. 7E, the data transmission enable signal DTE From the data transmission enabling unit 50 is high when the variable length coded data is transferred from the deformatter 13 to the first buffer 14 and low when the dummy data is transferred from the deformatter 13 to the first buffer 14. Therefore, the first buffer 14 stores only the actual compressed video data or the variable length coded data from the deformatter 13 when the data transmission enable signal DTE from the data transmission enabling unit 50 is high.

Figures 7A, 7B, 7C, 7D, 7E, 7F:
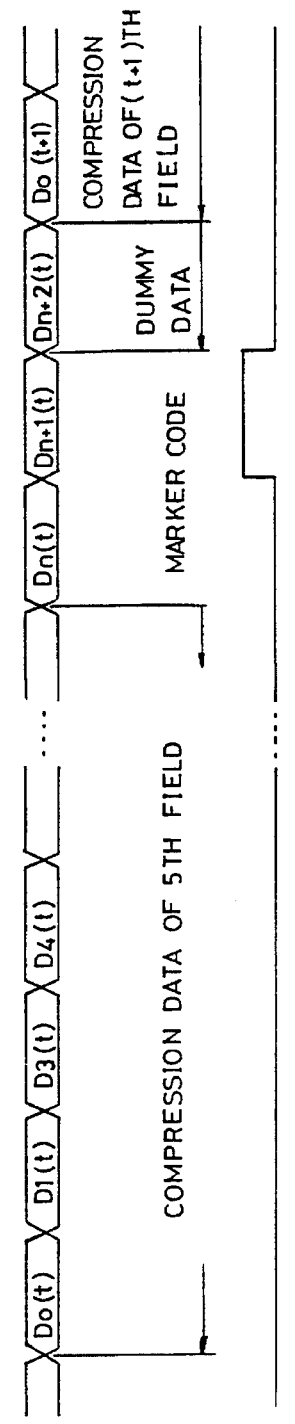

The start signal generator 60 generates the start signal START as shown in FIG. 7G in response to the data request signal DRQ from the video compression/expansion device 15 as shown in FIG. 7H, the data transmission enable signal DTE from the data transmission enabling unit 50 as shown in FIG. 7E and the clock signal From the clock generator 55 as shown in FIG. 7F. The start signal START from the start signal generator 60 is applied to the address generator 65 and the video compression/expansion device 15.

In response to the start signal START from the start signal generator 60, the address generator 65 generates the address signal ADD as shown in FIG. 7I which addresses a CODEC register among various registers in the video compression/expansion device 15. As shown in FIGS. 7G and 7I, the address signal ADD from the address generator 65 is applied to the video compression/expansion device 15 when the start signal START from the start signal generator 60 is low.

The compressed video data of 8-bit words stored in the first buffer 14 are read and rearranged into a 32-bit word by the bit rearrangement unit 70 and then applied to the video compression/expansion device 15 For one clock period just after generation of the address signal ADD as shown in FIG. I. Noticeably, if the compressed video data from the first buffer 14 is unconditionally read and applied to the video compression/expansion device 15 under the condition that the data request signal DRQ from the video compression/expansion device 15 is low, an underflow or an overflow is generated at the first buffer 14 because the clock signal as shown in FIG. 7F, used in reading the data from the first buffer 14 is not locked by a phase locked loop (PLL). For the purpose of avoiding the underflow or the overflow at the first buffer 14, the compressed video data from the first buffer 14 is applied to the video compression/expansion device 15 when the data transmission enable signal DTE from the data transmission enabling unit 50 is high and the data request signal DRQ from the video compression/expansion device 15 is low.

Then, the video compression/expansion device 15 expands the compressed video data from the bit rearrangement unit 70 and stores the expanded video data into the second buffer 16 temporarily. The D/A converter 17 converts the video data stored in the second buffer 16 into the original analog video signal and outputs the converted analog video signal to a monitor.

As apparent from the above description, according to the present invention, the video compression/expansion device and the compressed data memory ape controlled by the simple logic control circuits with no use of a CPU. With this construction, it is possible to real time-process the operations of reading a video signal of a TV signal of a NTSC system as well as a still video signal from the video tape, expanding the read video signals and displaying the expanded video signals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video compression/expansion apparatus for a digital VCR, comprising an analog/digital converter, a memory, a video compression/expansion device, compressed data storage means and a modem sequentially connected and electrically coupled to one another, for converting an analog video signal into digital video data, compressing the digital video data and recording the compressed video data on a video tape, and comprising an error corrector, a deformatter, a first buffer, a second buffer and a digital/analog converter sequentially connected and electrically coupled to one another, said error corrector connected to an output of said modem, said first buffer connected to an input of said video compression/expansion device, said second buffer connected to an output of said video compression/expansion device, for expanding the compressed video data recorded on the video tape to playback the original analog video signal, wherein the improvement comprises:

said compressed data storage means having first and second memories;

first logic control means for controlling said video compression/expansion device and said compressed data storage means to transform compressed video data of 32 bits from said video compression/expansion device into foyer 8-bit data and alternately store the transformed four 8-bit data into said first and second memories of said compressed data storage means;

formatting means for reading the compressed video data from said first and second memories of said compressed data storage means and formatting the read video data at a fixed rate;

error correcting code generating means for detecting an error of the compressed video data formatted by said formatting means, generating an additional code for correction of the detected error and outputting the generated additional code together with the compressed video data; and second logic control means responsive to a clock signal and a vertical synchronous signal from said deformatter for storing and rearranging compressed video data from said deformatter and controlling transmission of the rearranged, compressed video data to said video compression/expansion device.

2. A video compression/expansion apparatus for a digital VCR, as set forth in claim 1, wherein said first logic control means includes:

a timing signal generator for generating three timing signals to a host bus interface of said video compression/expansion device;

a data transformer for transforming the compressed video data of 32 bits from said host bus interface into the four 8-bit data and alternately outputting the transformed four 8-bit data to said first and second memories of said compressed data storage means;

a start signal generator for generating a data transmission start signal in response to a data request signal from said host bus interface and a start enable signal from said data transformer and outputting the generated data transmission start signal to said host bus interface;

a clock generator for generating a clock signal to said host bus interface, said start signal generator and said data transformer; and an address generator for generating an address signal to said host bus interface in response to the data transmission start signal from said start signal generator.

3. A video compression/expansion apparatus for a digital VCR, as set forth in claim 1, wherein said second logic control means includes:

a marker code detector for detecting a marker code of the compressed video data from said deformatter in response to a clock signal from said deformatter and outputting a marker code detect signal upon detecting the marker code;

a data transmission enabling unit for generating a data transmission enable signal in response to a vertical synchronous signal from said deformatter and the marker code detect signal from said marker code detector;

said first buffer storing the compressed video data from said deformatter in the unit of 8 bits in response to the clock signal from said deformatter and the data transmission enable signal from said data transmission enabling unit;

a clock generator fen generating a clock signal;

a start signal generator for generating a start signal in response to a data request signal from said video compression/expansion device, the data transmission enable signal from said data transmission enabling unit and the clock signal from said clock generator;

an address generator for generating an address signal in response to the start signal from said start signal generator; and a bit, rearrangement unit for rearranging the compressed video data stored in said first buffer into 32-bit data in response to the clock signal from said clock generator.

* * * * *